US006917978B1

(12) United States Patent
Jinzaki

(10) Patent No.: US 6,917,978 B1
(45) Date of Patent: Jul. 12, 2005

(54) NETWORK SYSTEM HAVING FUNCTION OF RETRIEVING INFORMATION, NETWORK TERMINAL DEVICE HAVING FUNCTION OF RETRIEVING INFORMATION, AND NETWORK RELAY DEVICE HAVING FUNCTION OF RETRIEVING INFORMATION

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 722 days.

(21) Appl. No.: 09/675,060

(22) Filed: Sep. 29, 2000

(30) Foreign Application Priority Data

Oct. 26, 1999 (JP) .......................................... 11-303543

(51) Int. Cl.⁷ .......................................... G06F 15/173
(52) U.S. Cl. ........................ 709/227; 709/228; 709/230; 707/100
(58) Field of Search ................................ 709/227, 228, 709/229, 230, 232, 239; 707/100

(56) References Cited

U.S. PATENT DOCUMENTS

| | | | |
|---|---|---|---|
| 6,324,582 B1 * | 11/2001 | Sridhar et al. .............. | 709/230 |
| 6,421,675 B1 * | 7/2002 | Ryan et al. .................. | 707/100 |
| 6,446,111 B1 * | 9/2002 | Lowery ....................... | 709/203 |
| 6,449,640 B1 * | 9/2002 | Haverstock et al. ........ | 709/219 |
| 6,654,813 B1 * | 11/2003 | Black et al. ................. | 709/245 |

FOREIGN PATENT DOCUMENTS

| JP | 09321633 A | 12/1997 | ............ H03M/7/40 |
|---|---|---|---|

OTHER PUBLICATIONS

Universal Resource Identifiers in WWW, RFC 1630, IETF, Network Working Group, T. Berners–Lee, Jun. 1994.
Functional Requirement for Uniform Resource Names, RFC 1737, IETF, Network Working Group, K. Sollins, Dec. 1994.
URN Syntax, RFC 2141, IETF, Network Working Group, R. Moats, May 1997.
Best et al., "The European Wide Service Exchange", IEEE International Conference on Systems, Man and Cybernetics, Beijing, China, Oct. 14–17, 1996, pp. 3222–3229.
Chakrabarti et al., "Surfing the Web backwards", Computer Networks, Elsevier Science Publishers, vol. 31, No. 11–16, May 17, 1999, pp. 1679–1693.
Patent Abstracts of Japan, Publication No. 09321933 for JP 8–136137, vol. 1998, No. 4, Mar. 31, 1998.
Malkin, "RFC 2453: RIP Version 2", Nov. 1998, retrieved from the Internet on Oct. 15, 2002 from www.faqs.org/ftp/rfc/ppdf/rfc2453.txt.pdf.

(Continued)

*Primary Examiner*—John Follansbee
*Assistant Examiner*—Jinsong Hu
(74) *Attorney, Agent, or Firm*—Staas & Halsey LLP

(57) ABSTRACT

An information transfer mechanism including (all or a part of) a retrieval mechanism can be realized. A user mechanism converts numeric data indicating 'information' into a uniquely corresponding information network address, and transmits a packet storing the address to the network. A relay mechanism which has received the packet determines the route to a host storing the information corresponding to the information network address stored in it, and relays the packet. Upon receipt of the returned packet from the host, the relay mechanism determines the route to the user mechanism corresponding to the network address stored in the return packet, and relays the return packet. Upon receipt of the return packet from the relay mechanism, the user mechanism receives the information stored in the return packet.

26 Claims, 11 Drawing Sheets

OTHER PUBLICATIONS

Derring et al., RFC 2460: Internet Protocol, Version 6 (IPv6), Dec. 1998, retrieved from the Internet on Oct. 15, 2002 from www.faqs.org/ftp/rfc/ppdf/rfc2460.txt.pdf.

Rivest, R., RFC1321, "The MD5 Message–Digest Algorithm," Apr. 1992.

Postel, J., RFC1591, "Domain Name System Structure and Delegation," Mar., 1994.

Rekhter, Y., et al., RFC1771, "A Border Gateway Protocol 4 (BGP–4),"Mar. 1995

Malkin, G., RFC2453, "RIP Version 2," Nov., 1998.

Wessels, D., et al., RFC2186, "Internet Cache Protocol (ICP) Version 2," Sep. 1997.

Partridge, C., et al., RFC1546, "Host Anycasting Service," Nov. 1993.

Hinden, R., et al., RFC2375, "Ipv6 Multicast Address Assignments," Jul. 1998.

Deering, S., et al., RFC2460, Internet Protocol, Version6 (Ipv6) Specification, Dec., 1998.

Wessels, D, et al., RFC 2187, "Application of Internet Cache Protocol (ICP), Version 2," Sep., 1997.

R. Daniel et al., "Resolution of Uniform Resource Identifiers Using the Domain Name System", RFC2168, Network Working Group, Jun. 1997, pp. 1–20.

R. Daniel, "A Trivial Convention for using HTTP in URN Resolution", RFC2169, Network Working Group, Jun. 1997, pp. 1–9.

M. Mealling et al., "URI Resolution Services Necessary for URN Resolution", RFC2483, Network Working Group, Jan. 1999, pp. 1–16.

Postel, J., Internet Protocol, Darpa Internet Program Protocol Specification, Sep. 1981.

Berners–Lee, T., et al., RFC1738, Uniform Resource Locators (URL), Dec., 1994.

* cited by examiner

| VERS | HLEN | TOS | TOTAL LENGTH | |
|---|---|---|---|---|
| IDENTIFICATION | | | FLAGS | FRAGMENT OFFSET |
| TIME TO LIVE | | PROTOCOL | HEADER CHECKSUM | |
| SOURCE IP ADDRESS | | | | |
| DESTINATION IP ADDRESS | | | | |
| IP OPTIONS & PADDING | | | | |

FIG. 6

```
  0 1 2 3 4     8              16            24           31
A │0│ NETWORK  │          HOST ADDRESS               │
  │ │ ADDRESS │                                      │
B │1│0│  NETWORK ADDRESS     │     HOST ADDRESS      │
C │1│1│0│       NETWORK ADDRESS          │   HOST    │
  │ │ │ │                                │  ADDRESS  │
D │1│1│1│0│         MULTICAST ADDRESS               │
E │1│1│1│1│0│   ADDRESS RESERVED FOR FUTURE USE     │
```

| CLASS | RANGE | | |
|---|---|---|---|
| A | 0.0.0.0 | ~ | 127.255.255.255 |
| B | 128.0.0.0 | ~ | 191.255.255.255 |
| C | 192.0.0.0 | ~ | 223.255.255.255 |
| D | 224.0.0.0 | ~ | 239.255.255.255 |
| E | 240.0.0.0 | ~ | 247.255.255.255 |
| PRIVATE ADDRESS | 10.0.0.0 | ~ | 10.255.255.255 |
| | 172.0.0.0 | ~ | 172.31.255.255 |
| | 192.168.0.0 | ~ | 192.168.255.255 |

FIG. 7

| NETWORK ADDRESS | MASK | RELAYED-TO LINK ADDRESS | DISTANCE |
|---|---|---|---|
| ADDRESS 1 | MASK 1 | RELAYED-TO LINK 1 | DISTANCE 1 |
| ADDRESS 2 | MASK 2 | RELAYED-TO LINK 2 | DISTANCE 2 |
| ADDRESS 3 | MASK 3 | RELAYED-TO LINK 3 | DISTANCE 3 |
| ... | ... | ... | ... |

FIG. 8

| INFORMATION NETWORK ADDRESS | RELAYED-TO LINK ADDRESS | DISTANCE |
|---|---|---|
| ADDRESS 1 | RELAYED-TO LINK 1 | DISTANCE 1 |
| ADDRESS 2 | RELAYED-TO LINK 2 | DISTANCE 2 |
| ADDRESS 3 | RELAYED-TO LINK 3 | DISTANCE 3 |
| ... | ... | ... |

| STEP | PROCESS NAME | CONTENTS OF PROCESS | STATE TRANSITION |
|---|---|---|---|
| 1 | PACKET RECEPTION WAITING PROCESS | WAITING FOR RECEPTION OF PACKET | RECEIVING RELAY PACKET → 2<br>RECEIVING MANAGEMENT PACKET → 3 |
| 2 | PACKET RECEIVING PROCESS | CHECKING RECEIVED PACKET | |
| | | CHECKING DESTINATION ADDRESS | INFORMATION NETWORK ADDRESS → 2-1<br>NORMAL NETWORK ADDRESS → 2-2 |
| 2-1 | INFORMATION ROUTE RELAYING PROCESS | SEARCHING ROUTE TABLE USING INFORMATION NETWORK ADDRESS | → 3 |
| | | DETERMINING OPTIMUM INFORMATION ROUTE | |
| | | TRANSFER PACKET IF POSSIBLE | |
| 2-2 | NORMAL ROUTE RELAYING PROCESS | SEARCHING ROUTE TABLE USING NETWORK ADDRESS | → 3 |
| | | DETERMINING OPTIMUM ROUTE | |
| | | TRANSFERRING PACKET IF POSSIBLE | |
| 3 | INFORMATION ROUTING PROCESS | CHECKING RECEIVED PACKET | WHEN MANAGEMENT PACKET IS RECEIVED → 3-1<br>WHEN RELAY PACKET IS RECEIVED → 3-2 |
| 3-1 | ROUTE UPDATING PROCESS USING MANAGEMENT PACKET | UPDATING ROUTE TABLE USING INFORMATION NETWORK ADDRESS AND ROUTE TABLE USING NETWORK ADDRESS AT INSTRUCTION OF MANAGEMENT PACKET | → 1 |
| 3-2 | SOURCE ADDRESS CHECKING PROCESS | CHECKING SOURCE ADDRESS OF RELAY PACKET | INFORMATION NETWORK ADDRESS → 4<br>NORMAL NETWORK ADDRESS → 1 |
| 4 | INFORMATION ROUTE UPDATING PROCESS | UPDATING ROUTE TABLE USING INFORMATION NETWORK ADDRESS FOR INFORMATION ROUTE IN DIRECTION OF LINK THROUGH WHICH RELAY PACKET IS RECEIVED | → 1 |

NETWORK SYSTEM HAVING FUNCTION OF RETRIEVING INFORMATION, NETWORK TERMINAL DEVICE HAVING FUNCTION OF RETRIEVING INFORMATION, AND NETWORK RELAY DEVICE HAVING FUNCTION OF RETRIEVING INFORMATION

BACKGROUND OF THE INVENTION

1. Field of the Invention

The present invention relates to a technology of locating information and a technology of obtaining information in a service, in which various information is obtained through a network, represented by the World Wide Web (WWW) service of the Internet.

2. Description of the Related Art

The conventional communications technology provides a system of establishing communications by specifying a subject (a person, a communications device, a computer, etc.). Therefore, a user performs the following processes through a network as shown in FIG. 1 to obtain necessary information.

- checking (retrieving) necessary information in the network; and
- obtaining (transferring) the information from a computer storing the information through a relay device in the network In the above mentioned method, the quality of a retrieval result (quality of obtained information, accessibility through a network, etc.) largely depends on the ability of a user. Therefore, for example, necessary information may be inefficiently transferred from a remote place without knowing that it is also located close to a user in a network (that is, stored in a place accessible in transfer or at a high speed), Such inefficiency brings not only a disadvantage to a user but also heavy load to the network and the computer, thereby bringing disadvantages to the entire system.

As a conventional technology developed to solve the above mentioned problem, a retrieval service (a search engine, for example, 'YAHOO as a service of the Internet') is used in a retrieving process, and an agent service (a proxy service) is used in a transferring process.

A retrieval service relates to a database system, and retrieves an address in a network of computers containing information related to a keyword assigned by a user, and returns the result. The user determines a computer having necessary information based on a plurality of retrieval results, and requests the computer to transfer the information.

An agent service is also referred to as a cache service. That is, the information previously transferred by a user is cached for a predetermined period, and the cached information can be transferred without issuing a request to the destination computer when the second and subsequent requests to transfer the information are issued. If the user can be provided with an agent service in the neighborhood in the network, the above mentioned inefficiency of transferring the information from a remote computer in the network can be avoided.

However, in the conventional technology described above, a retrieval and a transfer are performed independently of each other, there is an inefficiency which can not be avoided.

For example, although a database of the retrieval service is updated frequently, a computer containing network addresses obtained through the retrieval results may store no information at all, or a computer containing the network addresses may stop or be removed. In these cases, communications are not established. Normally, the configuration and the position of a computer in a network system can be changed. Unless the retrieval service reflects such a change at a practically high speed, a user cannot obtain the information, unnecessary cost arises in transferring information, wasteful traffic is used in the network, and other problems of inefficiency occur.

Even when there are no problems with the update of information, an inefficient process may arise.

For example, assume that results X1 and X2 are obtained by retrieving information X. When an X1 is a remote computer in the network, and an X2 is a computer closer than the X1, the user will select the X2. However, the nearest agent server may store the information about the X1. In this case, it is more efficient to select and transfer the X1.

Thus, it is very difficult to centrally manage the retrieval service including the location the replicas of information in the network.

In summary, the conventional technology has the problem that inefficiency occurs by the difference between a retrieval result and an actual state because a retrieval mechanism is independent of a transfer mechanism.

SUMMARY OF THE INVENTION

The present invention aims at realizing an information transfer mechanism having (all or a part of) an incorporated retrieval mechanism.

The present invention is based on a network system which communicates with a network device storing information or other objects.

An information network address unit (user mechanism) assigns an information network address, which is a network address, to the name of information or an object.

An information retrieval communications unit (communications mechanism and relay mechanism) establishes communications using an information network address for a corresponding network device storing information or an object.

With the above mentioned configuration according to the present invention, the information network address unit can be designed to include an information network address generation unit (information network address mechanism) for receiving information representing the feature of information or an object, and outputting an information network address. The information network address generation unit includes, for example, an operations unit (operations mechanism) for generating an information network address by operations. Furthermore, the operations unit performs operations on an error detection and correction code such as a CRC, etc. Otherwise, the operations unit performs operations on a secure hash function such as an MD5, etc. The above mentioned information network address generation unit includes a database accumulating correspondence between information or an object and an information network address, and generates an information network address by searching the database. Furthermore, the database is, for example, a server of a domain system in which a record type indicating the name of information or an object is added. The information network address generation unit inquires the server of an information network address corresponding to the name of the information or the object. The database can also be a plurality of WEB search engine system, and the information network address generation unit inquires the retrieval system of uniform resource locator information to generate an information network address.

In addition, the information network address unit can also be designed to include an adjustment unit (adjustment mechanism) for adjusting the length and the representation of a result obtained by inputting the information indicating the feature of information or an object such that the result can be assigned to a part or all of the existing network address as an information network address.

Furthermore, a unit which forms the information retrieval communications unit and relays a packet addressed to the destination specified by an information network address may include an information network address identification unit for identifying an information network address and an information route management unit for managing an information route traced using an information network address. The relay unit can be designed to relay a packet through an information route. The information route management unit manages an information route according to the information set in a packet transmitted from an information network address used in the previous relaying process.

The above mentioned information retrieval communications unit can be designed to establish communications using an information network address through an existing communications mechanism for a network address already existing as an information network address.

Furthermore, the above mentioned information retrieval communications unit can be designed to assign an information network address to an existing anycast address, multicast address, or broadcast address.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 6 shows the configuration of an IPv4 header;

FIG. 7 shows the assignment of an IPv4 address;

FIG. 8 shows an example of the configuration of a route table using network addresses;

FIG. 9 shows an example of the configuration of the route table using information network addresses;

FIG. 11 shows a packet process of a relay mechanism.

DESCRIPTION OF THE PREFERRED EMBODIMENTS

Figure 1:
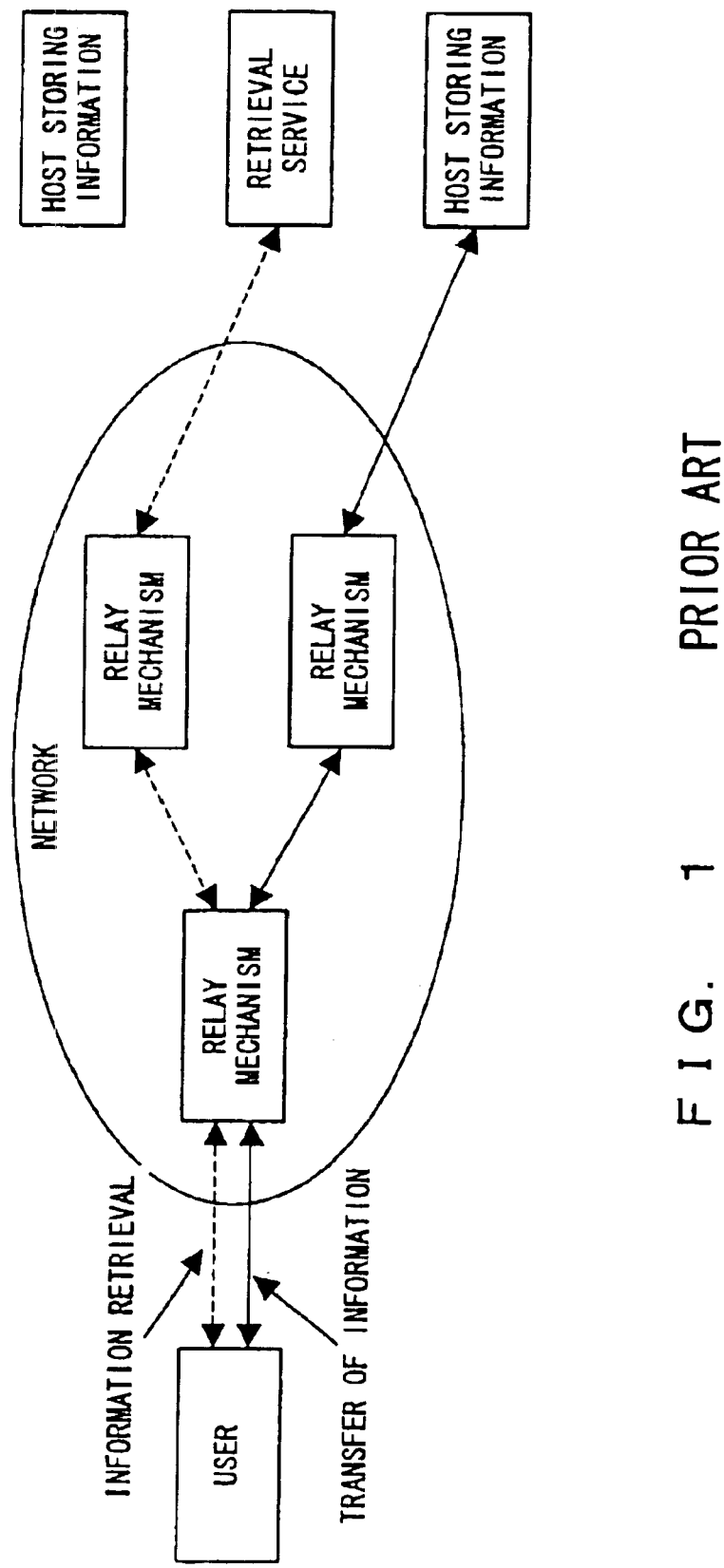
FIG. 1 shows the process of retrieving and transferring information in the conventional technology.

Embodiments of the present invention are described below in detail by referring to the attached drawings.

Normally, a network address is information for communications (for example, a transmission of a packet) through a network, and is used when a relay mechanism in the network, which transmits information between a communications device and another communications device, determines the transfer destination of a packet.

Therefore, a network address indicates the position and the identification name of a communications device in a network. For example, a MAC (media access control) address used in Ethernet is an identification name uniquely identifying the network interface in Ethernet. An IP (Internet protocol) address used in Internet is an identification name uniquely identifying the host connected to Internet. Internet has a mechanism for transferring an IP packet according to the unique identification name, and the mechanism performs communications between hosts. A host refers to a device connected to a network, and functions as an end point of communications. Normally, it is a computer. On the other hand, a router mechanism and a relay mechanism do not function as end points themselves, but are fundamentally used to relay a communications packet between hosts. A network device refers to a communications device comprising a host, a router mechanism, and a relay mechanism.

According to the present invention, to incorporate (all or a part of) a retrieval mechanism into a relay mechanism, an information network address is installed as a new type of network address.

An information network address is an identification name of information and an object, and is different from the conventional network address.

First, an information network address is an identification name of specific information or object, and does not uniquely specify a host.

Next, an information network address specifies a host holding the information or object. If one host holds plural pieces of information, the host has a plurality of information network addresses. If a plurality of hosts have the same information, the hosts have the same information network addresses.

If the above mentioned information network address is assumed, a transfer mechanism containing (all or a part of) a retrieval mechanism can be realized.

As described above, inevitable inefficiency arises in the conventional technology because a retrieving process is performed independent of a transferring process. This problem can be solved as described below by installing the information network address.

First, a retrieval service for checking the correspondence between information and a network address is not required. Therefore, a user is free from an operation of obtaining a network address through the retrieval service. Since an information network address specifies the host containing corresponding information, a host accessed by a user using an information network address necessarily contains information. If communications cannot be established using an information network address, it means that the information exists nowhere in the network. When the configuration or the position of a host is changed, the change information can be transmitted as route information to a routing mechanism. Therefore, the user can access the optimum host (nearest host or less expensive host in cost) in the network. In addition, if a destination host becomes down during the transfer of information, or if the network becomes faulty, the information can be transferred with the faulty host replaced with another host accessible and containing the same information. Since the flow of information can be grasped and the latest information can be constantly located (the destination of a packet addressed to the information network address) by monitoring the information network address of a packet transferred through a network, the user can transfer the information from the optimum host with little attention.

In FIGS. 2 through 5 show the configuration of the system for realizing the above mentioned functions according to an embodiment of the present invention.

Figure 2:
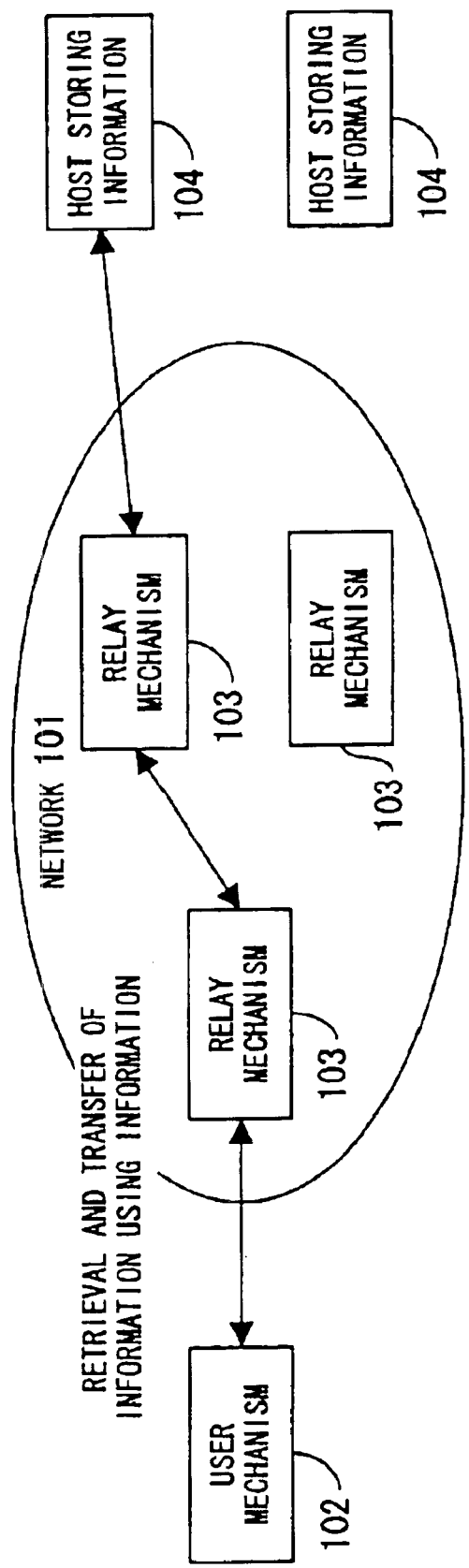
FIG. 2 shows the entire configuration of the system according to an embodiment of the present invention.

First, FIG. 2 shows the configuration of the entire system according to an embodiment of the present invention.

A network 101 comprises a user mechanism 102, a host 104 containing information, a relay mechanism 103, etc.

The user mechanism 102 converts a character string, an image, voice, and other numeric data having an optional length representing 'information' input as a communications target into a uniquely corresponding information network address, and transmits a packet storing the information network address to the network 101.

Upon receipt of the packet from the user mechanism 102, the relay mechanism 103 in the network 101 determines the route to the host 104 containing the information corresponding to the information network address stored in the packet, and relays the packet.

Upon receipt of the packet from the relay mechanism 103, the host 104 stores the information corresponding to the information network address stored in the packet in a return packet having a network address corresponding to the user mechanism 102 as a destination address, and transmits it to the network 101.

Upon receipt of the return packet from the host 104, the relay mechanism 103 determines the route to the user mechanism 102 corresponding to the network address stored in the return packet, and relays the return packet.

Upon receipt of the return packet from the relay mechanism 103, the user mechanism 102 receives the information stored in the return packet.

Figure 3:
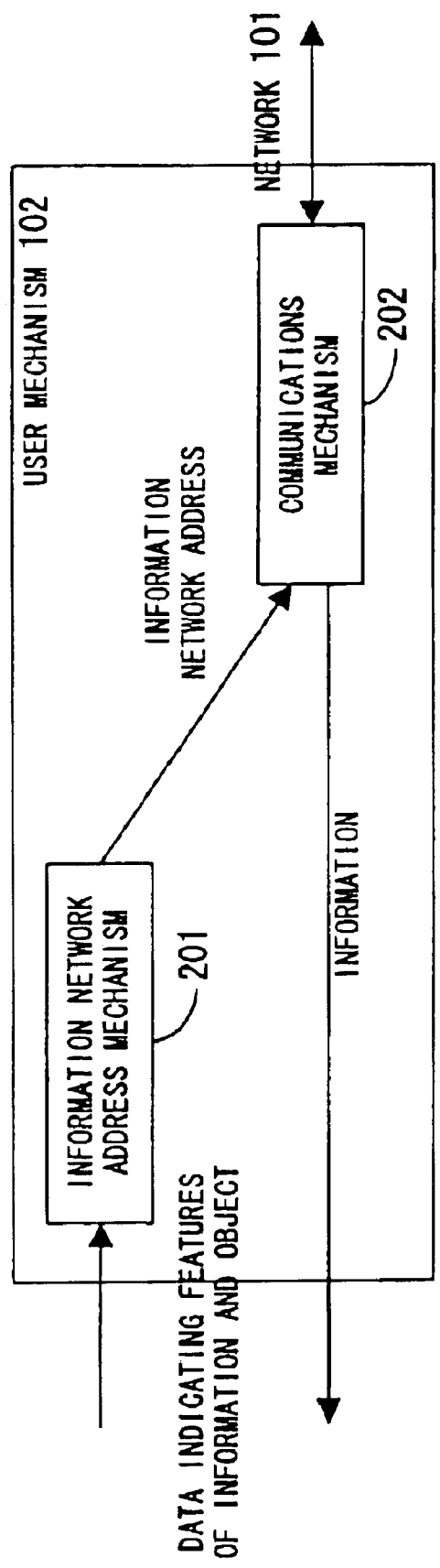
FIG. 3 shows the configuration of a user mechanism.

FIG. 3 shows the configuration of the user mechanism 102 shown in FIG. 2.

A information network address mechanism 201 converts a character string, an image, voice, and other numeric data having an optional length representing 'information' input as a communications target into a uniquely corresponding information network address.

A communications mechanism 202 generates a packet storing the above mentioned information network address and other communications information, transmits it to the network 101, or receives a packet from the network 101 and extracts information from the packet.

Figure 4:
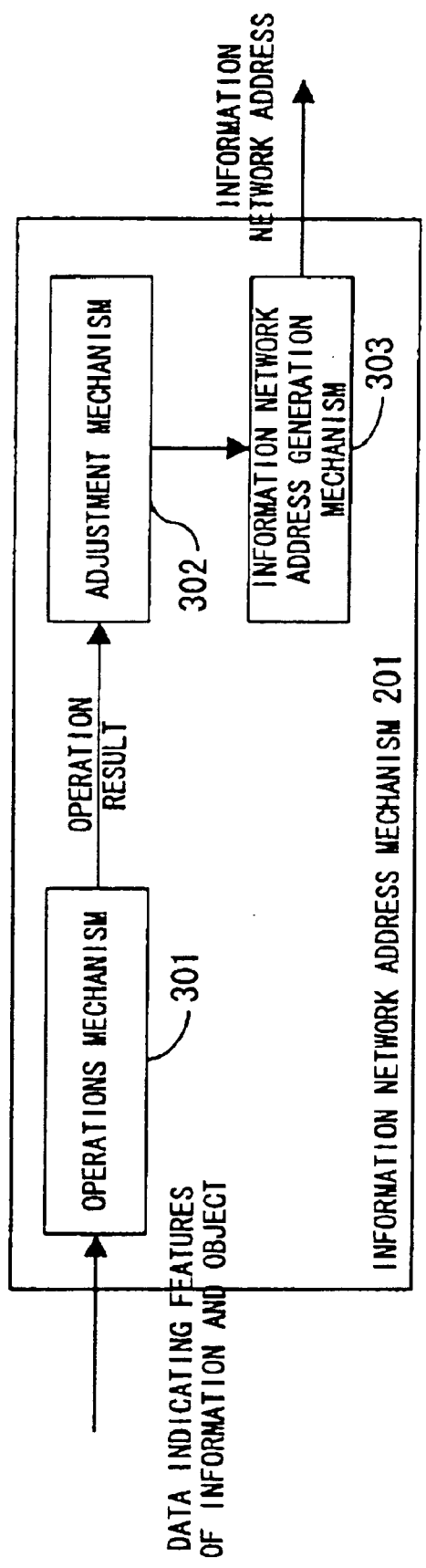
FIG. 4 shows the configuration of an information network address.

FIG. 4 shows the configuration of the information network address mechanism 201 shown in FIG. 3.

An operations mechanism 301 computes a unique value for determination of an information network address from a character string, an image, voice, and other numeric data having an optional length representing 'information' input as a communications target.

An adjustment mechanism 302 adjusts the length and expression of the computation result output from the operations mechanism 301 such that it can be allotted to a part or all of an existing network address.

An information network address generation mechanism 303 generates an information network address based on the computation result adjusted by the adjustment mechanism 302, and outputs it to the communications mechanism 202 shown in FIG. 2.

Figure 5:
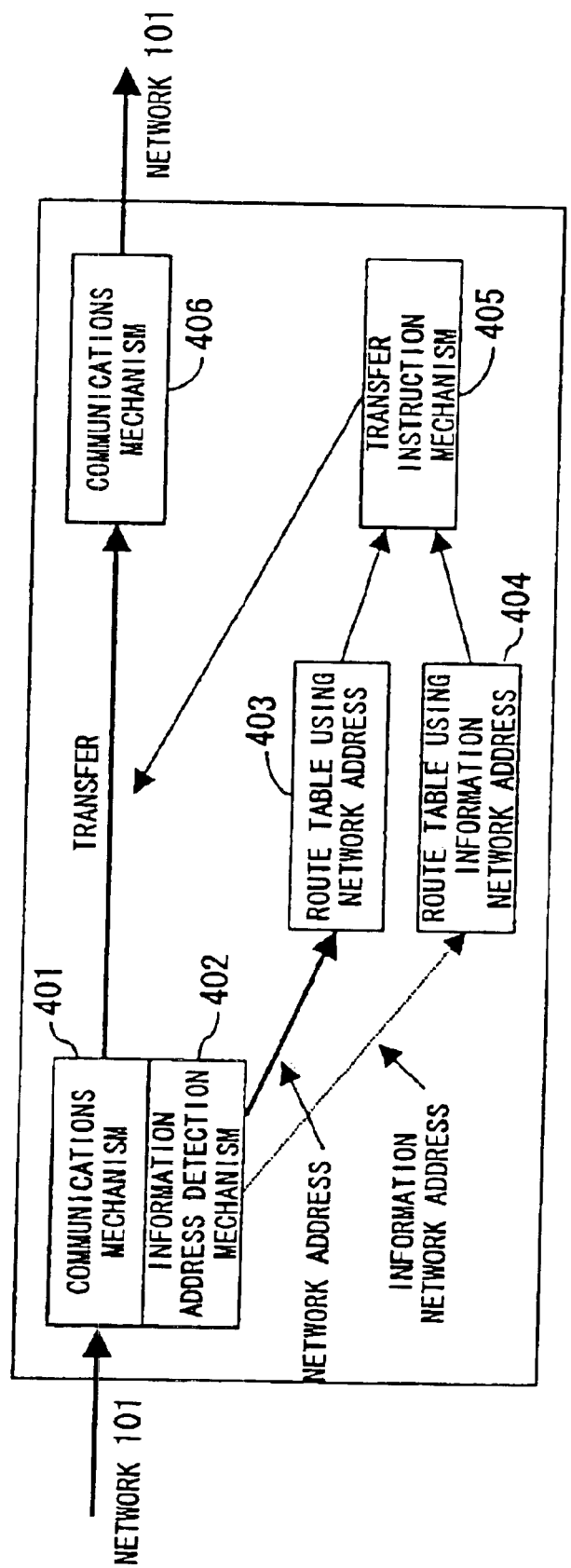
FIG. 5 shows the configuration of a relay mechanism (routing mechanism)

FIG. 5 shows the configuration of the relay mechanism (routing mechanism) 103 shown in FIG. 2.

A communications mechanism 401 receives a packet from the network 101 shown in FIG. 2.

An information address detection mechanism 402 detects a network address and an information network address from a received packet.

A transfer instruction mechanism 405 transfers a packet received by the communications mechanism 401 to a communications mechanism 406 corresponding to an appropriate route by referring to a route table 403 using a network address according to the network address detected by the information address detection mechanism 402, and by referring to a route table 404 using an information network address according to the information network address detected by the information address detection mechanism 402.

The communications mechanism 406 transmits again a packet transferred from the communications mechanism 401 to the network 101 shown in FIG. 2.

Described below is the details of an embodiment according to the present invention with the above mentioned configuration.

First described is the details of an information network address.

First, a 'network address' refers to an address used in a network layer (OSI layer 3). A typical example of this type of address can be an IP address in an Internet protocol. Although it is not a common technical term, an 'information address ' is used in Japanese corresponding to the URL (uniform resource locator (refer to RFC1738)). Since the present invention suggests an 'address indicating information' as an address (network address) of a network layer, an 'information network address' is used to clarify the difference from the 'information address'.

An information network address can be realized by assigning a portion used as the information network address to a part of an existing network address. In an IPv4 (Internet protocol version 4 (refer to RFC0791)), an address is represented by 32 bits. If 24 bits in the 32 bits are assigned to an information network address, it can be used as an information network address of the information of 224 (about 16 million) types. In the IPv6 (Internet protocol version 6 (refer to RFC2460)), an address is represented by 128 bits. Assuming that a half of the bits are used for an information network address, 264 (4 billion multiplied by 4 billion), that is, infinite information network addresses can be provided. It is obvious that an address system independent of a network address can be defined. In this case, however, the relay mechanism 103 in the network 101 has to refer to an information network address as well as a network address.

FIG. 6 shows the configuration of data of an IPv4 header.

A data field relating to the present invention can be, for example, a SOURCE IP ADDRESS field, a DESTINATION IP ADDRESS field, and an IP OPTIONS field.

The SOURCE IP ADDRESS field is a source address of a packet having the header. The DESTINATION IP ADDRESS field is a destination address of a packet having the header. The IP OPTIONS field is an area for realizing an option function defined separately.

The address of an IPv4 is 32 bits in length, and is prescribed as shown in FIG. 7.

For example, the address space of class E is reserved for future use. However, if the space is used as an information network address, it can be used as an address of 27 bits. A private address is a local address available only in a related organization, but can be used as an information network address because the use is up to the organization.

Therefore, the system of assigning an information network address can be:

re-assigning a network address of the IPv4 as an information network address;

assigning a reserved area;

newly defining and assigning an area as an information network address;

assigning a network address of the IPv4 to a private address; etc.

It is necessary to assign an address other than a private address with an international agreement. That is an address cannot be personally assigned. On the other hand, a private address is valid only in an independent organization. Therefore, when an information network address is used in a private organization, it can be freely assigned without international permission. Whether or not an international permission is required is a problem independent of the technology of the present invention, and is not discussed here. However, it is apparent in technique that a part of an existing network address can be assigned for an information network address. In addition, it is possible to assign an information network address in the similar method using other network addresses, for example, in an IPv6, etc.

An information network address can also be defined using an IP OPTIONS field. An IP OPTIONS field is not a field for a network address, but stores information to be referred to when the relay mechanism 103 (FIG. 2) such as a router, etc. relays a packet. To use an information network address in an IP OPTIONS field, its format is to be defined and an international agreement is required.

Since an IP address field is fixed in length while an IP OPTIONS field can be a longer area, a long address and a variable length address can be used as an information network address. However, in consideration of the process speed described later, data can be transmitted with a short fixed-length at a higher speed.

Next, the above mentioned information network address mechanism 201 (shown in FIG. 3) in the user mechanism 102 converts a character string, an image, voice, and other numeric data having an optional length representing 'information' input as a communications target into a uniquely corresponding information network address.

There are a large number of means for realizing the mechanism. It is expected that different pieces of information are assigned different information network addresses. However, this is not an absolute requirement, and several pieces of information which may be different at a certain probability can have the same information network addresses.

For example, an ISBN (international standard book number) assigned to a book is an identification number assigned to a book under management of a publisher. By assigning the number as is to an information network address, an information network address of a book can be obtained. However, since the management of numbers are left to a publisher, the same numbers can be assigned to others. Therefore, the number can be used double. However, from the viewpoint of searching for information, the numbering is effective enough.

Thus, there are other information network addresses assigned in a certain method, but an information network address having a given length can also be computed from optional information otherwise featuring information. The operations mechanism 301 shown in FIG. 4 provides the function.

For example, the operations mechanism 301 computes an error detection code in the CRC (cyclic redundancy check) system, etc. from data indicating given information. Normally, an error detection code in the CRC system, etc. is used to detect whether or not an error such as an irregular bit, etc. has occurred during the transmission of data. Based on that a different error detection code is assigned to each piece of data, an error detection code can be used to compute a short numeric string as an information network address from information of any length featuring information.

Otherwise, the operations mechanism 301 computes an information network address using a secure hash function from data indicating given information. For example, an MD 5 algorithm (message digest 5 (refer to RFC1321)) obtains an operation result of 128 bits by performing predetermined computation on original text of any length. This algorithm defines a computing method such that there is a very small possibility that the same value can be obtained from different pieces of original text. This indicates that if original text (information having any length and featuring information) is different, a different value can be obtained, and a different value can be used as a substantially unique information network address. The algorithm is a method of computing an information network address having a higher level in uniqueness than an error detection code.

To use an operation result from the operations mechanism 301 as an information network address, it may be necessary to reconvert the value of an operation result into an information network address. For example, an operation result obtained by the MD 5 algorithm is used in an information network address of 24 bits defined by the IPv4, the conversion from 128 bits to 24 bits is required. The adjustment mechanism 302 shown in FIG. 4 is a mechanism for performing the conversion, and is indispensable to obtain an information network address from existing information and operation system. The adjustment mechanism 302 can be realized by mechanically extracting a part of numeral data and performing again a coding process in the CRC system, etc.

FIG. 4 shows an example of the configuration in which the information network address mechanism 201 shown in FIG. 3 is realized as a mechanism for computing an information network address in an operation. On the other hand, it is also possible to design the information network address mechanism 201 such that a database accumulating correspondence between information and an information network address can be provided, in which an information network address is not obtained in an operation, but an information network address of the information can be obtained by searching the database.

Practically, the information network address mechanism 201 can be designed to obtain an information network address using a domain name system (DNS (refer to RFC1591)) widely used through Internet as a network address database. In the DNS, the address information of a network device can be defined and referred to according to a plurality of attributes. For example, an A record refers to an IPv4 address, an AAAA record refers to an IPv6 address. The network device can have both IPv4 and IPv6 addresses, and necessary address information can be obtained when a record is specified for reference. Then, as the information network address mechanism 201, a record type indicating the name of information or an object is added to the DNS server, and the DNS server is inquired. Thus, an information network address corresponding to the name of information or an object can be obtained.

Otherwise, the information network address mechanism 201 can also be designed to utilize the WWW (world wide web) retrieval engine to obtain an URL (uniform resource locator (uniform resource locator (refer to RFC1738)), and generate an information network address from the URL.

The 'Information Address Converting method, Information Address Conversion Apparatus, and Information Retrieval System' described in the Japanese Patent Publication No.9-3219633 (hereinafter referred to as a reference) is known as a similar technology. The difference between the reference and the present invention is described below.

The reference has the following features.

An information address such as an URL address, etc. comprising a character, a value, and a symbol string is converted into a short numeric string.

A compressed code system (Huffman code, arithmetic operation code) is used as a conversion system.

Information can be easily retrieved by a simple apparatus and operation by specifying an information address using a short numeric string.

The present invention suggests a system of obtaining a 'network address' from a character string indicating information, and is different in purpose and condition from the reference in which any format of 'numeric code' is obtained to 'easily retrieve information'.

First, the present invention aims at newly installing an 'information network address' to be used as a 'network address', and simultaneously performing a retrieving and transferring processes while the reference simply aims at retrieving information.

Relating to deriving a 'short numeric string' from a 'symbol string indicating information', the reference and the operations mechanism 301 and the adjustment mechanism 302 (shown in FIG. 4) of the present invention have fundamentally the same objects. However, according to the present invention, a derived 'short numeric string' is used as a part of a 'network address', which is different from the reference. Therefore, according to the present invention, the adjustment mechanism 302 for adjusting the derived 'short numeric string' into an existing 'network address' is required.

Finally, the present invention is different from the reference in a unit for actually deriving an address. The reference uses the compressed code system only, but the present invention uses not only the operations system, such as an error detecting operation, a secure hush function, etc., quite different from that of the reference, but also a system using a database. Thus, the present invention is quite different from the reference in realization system.

When a packet is transferred in a network, a relay mechanism in the network stores a route table, and transfers the packet to an appropriate link according to a result of retrieving a destination network address of a received packet on the route table. A similar route table (route table according to an information network address) is required in transferring a packet having an information network address.

Then, the relay mechanism 103 (FIG. 2) in the system according to the present embodiment of the present invention stores the route table 404 using an information network address in addition to the route table 403 using a conventional network address as shown in FIG. 5. The transfer instruction mechanism 405 in the relay mechanism 103 refers to the route table 403 using a network address based on the network address detected by the information address detection mechanism 402, and refers to the route table 404 using an information network address based on the information network address detected by the information address detection mechanism 402, thereby transferring the packet received by the communications mechanism 401 to the communications mechanism 406 corresponding to an appropriate route.

FIG. 8 shows an example of the configuration of the route table 403 using a network address. FIG. 9 shows an example of the configuration of the route table 404 using an information network address.

Various configurations of the route table 404 using an information network address can be listed, but essentially required are the following items.

Information specifying an 'information route' of an information network address, a group of information network addresses, etc.

a relayed-to link address metric value (distance)

state information

An 'information route' corresponds to the 'route' specified by a network address and the mask (shown in FIG. 8) of the network address in the route table used by a normal router. The transfer instruction mechanism 405 (shown in FIG. 5) in the relay mechanism 103 determines whether or not the destination address of the received packet is a part of the address or the address group specified by the item. If a matching result is output, the transfer instruction mechanism 405 transfers the packet to a corresponding 'relayed-to link address'.

Normally, a plurality of 'information routes' can be applied to one information network address. In this case, the optimum route can be selected using a 'metric value (distance)' as an index. A similar mechanism is used in a common route table (FIG. 8), and the metric value is dynamically adjusted to obtain the optimum route. Since route control using a metric value is a well-known technology, it is not explained in detail here.

In an information route, a packet is not transferred only through the optimum route, but a process of transferring a packet through a route having a relatively high metric value is also required because a retrieving process requires redundancy to a certain extent. Since a process of transferring a packet through a plurality of routes is performed in a common relay process in the broadcast or the multicast, the detailed explanation is omitted here.

The control information containing the state of a route, etc. is stored as 'state information' For example, when a relayed-to link is temporarily faulty, 'faulty' is set in the state information. Thus, the route can be temporarily set unavailable. Since the state information is commonly used as a well-known technology, the explanation is omitted here.

Described below is the operation of the relay mechanism 103 updating the route table 404 using an information network address.

Conventionally, the RIP (routing information protocol (refer to RFC2453)), the BGP (border gateway protocol (refer to RFC1771)) are known as means for updating a route table. These means provide the function of maintaining the contents of a route table in the latest state in the network by notifying each other of a change in a route between relay mechanisms.

It is inquired whether or not information identified by the URL is stored among the WWW agent server. If it is stored, the information is normally transmitted by an ICP (Internet cache protocol (refer to RFC2186/2187)). When an agent server does not store the information identified by the URL, it requests the final host identified by the URL to transfer the information, or inquire of another agent server whether or not the information identified by the URL is stored. If yes, the agent server is requested to transfer the information.

A similar means can be applied in the management of a route of an information network address.

Figure 10:
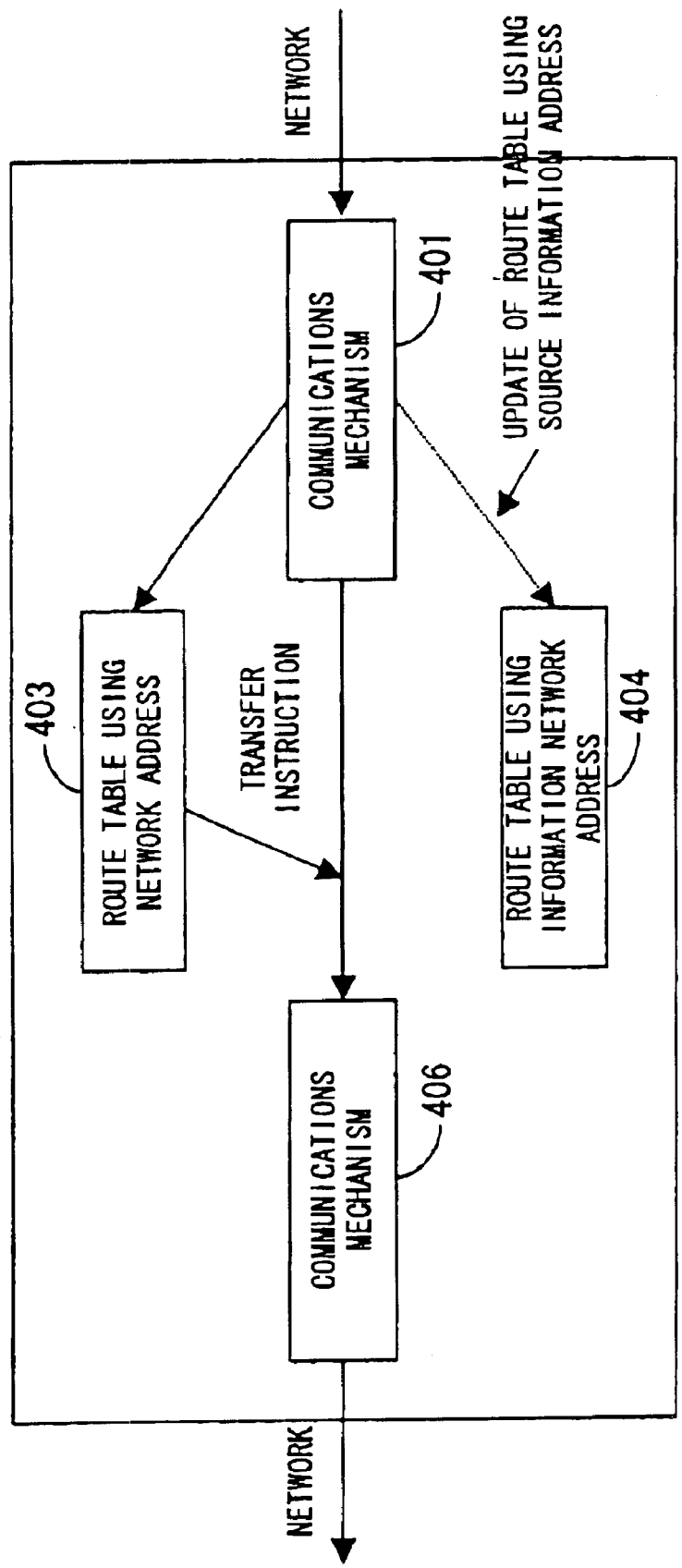
FIG. 10 shows an operation of updating a route table using information network addresses.

FIG. 10 shows the operation of updating the route table 404 using an information network address specific to the present invention.

The communications mechanism 401 (shown in FIG. 5) in the relay mechanism 103 checks the information network address of the packet received from the network 101, and has the 'information route' managed on the route table 404 using an information network address reflect the address according to a predetermined discrimination standard. When the source address information stored in the packet is an information network address, it is assumed that the host 104 (FIG. 1) storing the information identified by the information network address is located in the link area where the packet has arrived. Thus, appropriate adjustments can be automatically made corresponding to a change in network state by updating the 'information route' of the route table 404 using an information network address according to the source address information.

Thus, according to the present invention, assuming that the host 104 which transmits 'information' is located around the area of the source address of a relay packet (in the direction of receiving the relay packet), the route table 404 using an information network address is managed based on a source address, which is the novelty of the present invention.

FIG. 11 shows a packet process performed by the relay mechanism 103.

In FIG. 11, the relay mechanism 103 receives a management packet in addition to a normal relay packet. A management packet is used for update management of the route table 404 using an information network address, and is communicated between relay mechanisms 103.

First, in the packet reception waiting process in step 1, the relay mechanism 103 waits for the receipt of a packet from the network 101. When a relay packet is received, the relay mechanism 103 performs the process in step 2. When a management packet is received, it performs the information routing process in step 3.

In the packet receiving process (when a relay packet is received) in step 2, the relay mechanism 103 checks the destination address. If the address is an information network address, the relay mechanism 103 performs the information route relaying process in step 2-1. If the address is a normal network address, it performs the normal route relaying process in step 2-2.

The relay mechanism 103 searches the route table 404 (FIG. 5) using an information network address in the information route relaying process (when the destination address is an information network address), determines the optimum route, and transmits the packet through the determined route if possible. Then, the relay mechanism 103 performs the information routing process in step 3.

The relay mechanism 103 searches the route table 403 (FIG. 5) using a network address in the information route relaying process in step 2-2 (when the destination address is a normal network address), determines the optimum route, and transmits the packet through the route if possible. Then, the relay mechanism 103 performs the information routing process in step 3.

The relay mechanism 103 checks the type of the received packet in the information routing process in step 3. If the packet is a management packet, the relay mechanism 103 performs the route updating process using the management packet in step 3-1. If the packet is a relay packet, it performs the source address checking process in step 3-2.

The relay mechanism 103 updates the route table 404 using an information network address and the route table 403 using a network address at an instruction of the management packet in the route updating process using a management packet in step 3-1. Then, the relay mechanism 103 enters the packet reception waiting process in step 1.

The relay mechanism 103 checks the source address of the relay packet in the source address checking process in step 3-2. If the address is an information network address, the relay mechanism 103 performs the information route updating process in step 4. If the address is a normal network address, it returns the packet reception waiting process in step 1.

The relay mechanism 103 updates the route table 404 using an information network address for the information route in the direction of the link through which the relay packet is received in the route updating process in step 4. Then, the relay mechanism 103 returns to the packet reception waiting process in step 1.

In addition to the above mentioned embodiment, the present invention can be designed to establish communications using an information network address without setting an information network address route by using an existing communications mechanism for an existing network address used as an information network address.

Furthermore, the present invention can be designed to use an existing communications mechanism as is by assigning an information network address to a conventional anycast address (refer to RFC1546). The anycast address is basically similar to the unicast address, but refers to the 'optimum host' in the hosts belonging to a network.

Furthermore, the present invention can be designed to use an existing communications mechanism as is by assigning an information network address to a conventional multicast address (refer to RFC2375, etc. relating to the IPv6). A multicast address is assigned to a plurality of host groups.

Otherwise, the present invention can be designed to use an existing communications mechanism as is by assigning an information network address to a conventional broadcast address. A broadcast address is a special variation of a multicast address, and is used for broadcast for all hosts belonging to a specified network.

The present invention can also be designed as a computer readable storage medium for directing a computer to perform the function similar to the function realized by the user mechanism or the relay mechanism according to the above mentioned embodiments of the present invention. In this case, for example, using a portable storage media such as a floppy disk, a CD-ROM disk, an optical disk, a removable hard disk, etc., or through a network line, a program for realizing each function of the embodiments of the present invention is loaded onto the memory (RAM, hard disk, etc.) of the computer forming part of the user mechanism or the relay mechanism, and is then executed.

According to the present invention, a retrieval service in which the correspondence between information and a network address is not required.

When the configuration or the position of a host is changed, the change information can be transmitted as route information to a routing mechanism. Therefore, the user can access the optimum host (nearest host or less expensive host in cost) in the network. In addition, if a destination host becomes down during the transfer of information, or if the network becomes faulty, the information can be transferred with the faulty host replaced with another host accessible and containing the same information. Since the flow of information can be grasped and the latest information can be constantly located (the transfer destination of a packet addressed to the information network address) by monitoring the information network address of a packet transferred through a network, the user can transfer the information from the optimum host with little attention.

While the invention has been described with reference to the preferred embodiments thereof, various modifications and changes may be made to those skilled in the art without departing from the true spirit and scope of the invention as defined by the claims thereof.

What is claimed is:

1. A network system which communicates with a network device storing information or an object, and has a function of retrieving information, comprising:

an information network address unit monitoring information network addresses of packets transferred through the network system to track current locations of information, and assigning an information network address which is an identification name of specific information or an object and non-uniquely specifies a host holding the specific information or the object, where if one host holds plural pieces of information, the host has a plurality of information network addresses and if multiple hosts have identical information, the hosts have identical information network addresses, and where said information network address unit identifies another host accessible to the user and containing the specific information if the host becomes inaccessible to the user during transfer of information; and an information retrieval communications unit establishing communications for the network device storing the specific information or the object corresponding to the information network address, so that a user is not required to obtain a network address through a retrieval service for checking correspondence between information and network addresses, a host accessed by the user using the information network address necessarily contains information and if communications cannot be established using the information network address, the information exists nowhere in the network system, and the user is able to access a nearest host or least expensive host because change information is transmitted as route information to a routing mechanism in the network system when a configuration or position of any host is changed.

2. The system according to claim 1, wherein said information network address unit comprises an information network address generation unit inputting information indicating a feature of the information or the object, and outputting the information network address.

3. The system according to claim 2, wherein said information network address unit comprises an operations unit generating the information network address in arithmetic operation.

4. The system according to claim 3, wherein said operations unit computes an error detection and correction code.

5. The system according to claim 3, wherein said operations unit computes a secure hash function.

6. The system according to claim 2, wherein said information network address generation unit is equipped with a database for accumulating correspondence between the information or the object and the information network address, and generates the information network address by searching the database.

7. The system according to claim 6, wherein said information network address generation unit adds a record type indicating the name of the information or the object to a server of a domain name system which is the database, and obtains an information network address corresponding to the name of the information or the object.

8. The system according to claim 6, wherein said information network address generation unit inquires uniform resource locator information of a plurality of WEB search engine retrieval system which is the database, and generates the information network address according to the obtained information.

9. The system according to claim 1, wherein said information network address unit comprises an adjustment unit adjusting length and representation of a result obtained by inputting information indicating a feature of the information or an object such that the result can be assigned to a part or all of an existing network address as the information network address.

10. The system according to claim 1, wherein: a portion for forming part of said information retrieval communications unit and relaying a packet addressed to the information network address comprises:
an information network address identification unit identifying the information network address; and
an information route management unit managing an information route using the information network address, wherein
said relaying portion relays the packet through the information route.

11. The system according to claim 10, wherein said information route management unit manages the information route according to information set in a packet transmitted from a previously relayed information network address.

12. The system according to claim 1, wherein said information retrieval communications unit establishes communications using the information network address by using an existing network address as the information network address and an existing communications mechanism for the network address.

13. The system according to claim 1, wherein said information retrieval communications unit assigns the information network address to an existing any cast address.

14. The system according to claim 1, wherein said information retrieval communications unit assigns the information network address to an existing multicast address.

15. The system according to claim 1, wherein said information retrieval communications unit assigns the information network address to an existing broadcast address.

16. A network terminal device which communicates with a network device storing information or an object, and has a function of retrieving information, comprising:
an information network address unit monitoring information network addresses of packets transferred through the network system to track current locations of information, and assigning an information network address which is an identification name of specific information or an object and non-uniquely specifies a host holding the specific information or the object, where if one host holds plural pieces of information, the host has a plurality of information network addresses and if multiple hosts have identical information, the hosts have identical information network addresses, and where said information network address unit identifies another host accessible to the user and containing the specific information if the host becomes inaccessible to the user during transfer of information; and
an information retrieval communications unit establishing communications for the network device storing information or an object corresponding to the information network address, so that
a user is not required to obtain a network address through a retrieval service for checking correspondence between information and network addresses,
a host accessed by the user using the information network address necessarily contains information and if communications cannot be established using the information network address, the information exists nowhere in the network system, and
the user is able to access a nearest host or least expensive host because change information is transmitted as route information to a routing mechanism in the network system when a configuration or position of any host is changed.

17. A computer-readable storage medium storing a program that when executed controls a computer forming a network terminal device to perform a method for communicating with a network device storing information or an object, said method comprising:
monitoring information network addresses of packets transferred through a network to track current locations of information;
assigning an information network address which is an identification name of specific information or an object and non-uniquely specifies a host holding the specific information or the object, where if one host holds plural pieces of information, the host has a plurality of information network addresses and if multiple hosts have identical information, the hosts have identical information network addresses, and where said information network address unit identifies another host accessible to the user and containing the specific information if the host becomes inaccessible to the user during transfer of information; and
establishing communications for the network device storing the information or the object corresponding to the information network address, so that
a user is not required to obtain a network address through a retrieval service for checking correspondence between information and network addresses,
a host accessed by the user using the information network address necessarily contains information and if communications cannot be established using the information network address, the information exists nowhere in the network system, and
the user is able to access a nearest host or least expensive host because change information is transmitted as route information to a routing mechanism in the network system when a configuration or position of any host is changed.

18. A network relay device which relays communications established for a network device which stores specific information or an object using an information network address which is a network address assigned to an identification name of the specific information or the object, comprising:

an information network address identification unit monitoring information network addresses of packets transferred through a network to track current locations of information, and identifying the information network address to non-uniquely specify a host holding the specific information or the object, where if one host holds plural pieces of information, the host has a plurality of information network addresses and if multiple hosts have identical information, the hosts have identical information network addresses, and where said information network address unit identifies another host accessible to the user and containing the specific information if the host becomes inaccessible to the user during transfer of information; and an information route management unit managing an information route using the information network address to relay the packets through the information route, so that
  a user is not required to obtain a network address through a retrieval service for checking correspondence between information and network addresses,
  a host accessed by the user using the information network address necessarily contains information and if communications cannot be established using the information network address, the information exists nowhere in the network system, and
  the user is able to access a nearest host or least expensive host because change information is transmitted as route information to a routing mechanism in the network system when a configuration or position of any host is changed.

19. A computer-readable storage medium storing a program that when executed controls a computer in a network relay device to perform a method of relaying communications established for a network device which stores specific information or an object using an information network address which is a network address assigned to an identification name of the specific information or the object, said method comprising:

monitoring information network addresses of packets transferred through a network to track current locations of information;

identifying the information network address to non-uniquely specify a host holding the specific information or the object, where if one host holds plural pieces of information, the host has a plurality of information network addresses and if multiple hosts have identical information, the hosts have identical information network addresses, and where said information network address unit identifies another host accessible to the user and containing the specific information if the host becomes inaccessible to the user during transfer of information;

managing an information route according to the information network address; and relaying each packet through the information route, so that
  a user is not required to obtain a network address through a retrieval service for checking correspondence between information and network addresses,
  a host accessed by the user using the information network address necessarily contains information and if communications cannot be established using the information network address, the information exists nowhere in the network system, and
  the user is able to access a nearest host or least expensive host because change information is transmitted as route information to a routing mechanism in the network system when a configuration or position of any host is changed.

20. An information retrieving method for a network system comprises a user mechanism, a host containing information and a relay mechanism which communicates with a network device storing information or an object, said method comprising:

using the user mechanism to convert a character string, an image, voice, and other numeric data having an optional length representing information input as a communication target into a uniquely corresponding information network address, and to transmit a packet storing the information network address to the network;

upon receipt of the packet from the user mechanism, using the relay mechanism in the network to determine a route to the host containing the information corresponding to the information network address stored in the packet, and to relay the packet;

upon receipt of the packet from the relay mechanism, using the host to store the information corresponding to the information network address stored in the packet in a return packet having a user network address corresponding to the user mechanism as a destination address, and to transmit it to the network;

upon receipt of the return packet from the host, using the relay mechanism to determine the route to the user mechanism corresponding to the user network address stored in the return packet, and to relay the return packet; and upon receipt of the return packet from the relay mechanism, using the user mechanism to receive the information stored in the return packet.

21. The information retrieving method according to claim 20,
wherein the user mechanism comprises an information network address mechanism and a user communications mechanism, and
wherein said information retrieving method further comprises:
  using the information network address mechanism to convert the character string, the image, the voice, and the other numeric data into the uniquely corresponding information network address; and
  using the user communications mechanism to generate the packet storing the information network address and other communication information, to transmit the packet to the network, to receive the return packet from the network and to extract information from the return packet.

22. The information retrieving method according to claim 21,
wherein the information network address mechanism comprises an operations mechanism, an adjustment mechanism and an information network address generation mechanism, and
wherein said information retrieving method further comprises:
  using the operations mechanism to compute a unique value for determination of the uniquely corresponding information network address from the character string, the image, the voice, and the other numeric data;
  using the adjustment mechanism to adjust a length and expression of the unique value output from the operations mechanism to enable allotment of the unique value to part or all of an existing network address; and using the information network address generation mechanism to generate the uniquely corresponding information network address based on the unique value after adjustment by the adjustment mechanism, and to output the information network address to the user communications mechanism.

23. The information retrieving method according to claim 20, wherein the relay mechanism comprises relay communications mechanisms, an information address detection mechanism and a transfer instruction mechanism, and wherein said information retrieving method further comprises:

using a first relay communications mechanism to receive the packet from the network;

using the information address detection mechanism to detect a destination network address and the information network address from the packet;

using the transfer instruction mechanism to transfer the packet received by the first relay communications mechanism to a second relay communications mechanism corresponding to an appropriate route by referring to a first route table based on the destination network address detected by the information address detection mechanism, and by referring to a second route table based on the information network address detected by the information address detection mechanism;

using the second relay communications mechanism to transmit to the network a transferred packet obtained from the first relay communications mechanism;

using the first relay communications mechanism to check the information network address of the packet received from the network, and to manage an information route stored in the second route table to reflect the destination network address according to a predetermined discrimination standard; and when source address information stored in the packet is the information network address, using the first relay communications mechanism to adjust to a change in network state by updating the information route of the second route table according to the source address information.

24. A network communication system communicating with network devices storing at least one of information and objects, comprising:

at least one address monitoring unit obtaining current locations of the at least one of information and objects from packets transferred through the network communication system, and assigning information network addresses corresponding to the current locations, each information network address identifying specific information or an object stored on at least one host, where each host may have a plurality of information network addresses corresponding to different information or objects and multiple hosts may have identical information network addresses for identical information or objects; and at least one information retrieval communication unit establishing communication for a first network device to retrieve from a second network device at least one of an item of information and a specific object corresponding to a specific information network address, without obtaining a network address through a retrieval service for checking correspondence between information and network addresses, where if communication cannot be established using the specific information network address, the at least one of the item of information and the specific object is not accessible via the network communication system.

25. A network communication system according to claim 24, wherein said information network address unit identifies a third network device accessible to the first network device and containing the at least one of the item of information and the specific object if the second network device becomes inaccessible to the first network device during transfer of the at least one of the item of information and the specific object.

26. A network communication system according to claim 24, wherein said information network address unit updates each current location of the at least one of the item of information and the specific object in response to change information transmitted as route information when a change occurs in at least one of a configuration and a position of any network device storing the at least one of the item of information and the specific object, to enable the first network device to access at least one of a nearest network device and a least expensive network device storing the at least one of the item of information and the specific object.

* * * * *